United States Patent
Kolarich

(10) Patent No.: US 9,303,909 B2
(45) Date of Patent: Apr. 5, 2016

(54) APPARATUS FOR IMPROVING REFRIGERATION CAPACITY

(71) Applicant: Robert Kolarich, Brick, NJ (US)

(72) Inventor: Robert Kolarich, Brick, NJ (US)

( * ) Notice: Subject to any disclaimer, the term of this patent is extended or adjusted under 35 U.S.C. 154(b) by 459 days.

(21) Appl. No.: 13/964,198

(22) Filed: Aug. 12, 2013

(65) Prior Publication Data

US 2014/0047855 A1 Feb. 20, 2014

Related U.S. Application Data

(60) Provisional application No. 61/742,558, filed on Aug. 14, 2012.

(51) Int. Cl.
*F25B 49/02* (2006.01)
*B23P 15/26* (2006.01)

(52) U.S. Cl.
CPC .............. *F25B 49/02* (2013.01); *B23P 15/26* (2013.01); *Y10T 29/49352* (2015.01)

(58) Field of Classification Search
CPC .. F25B 45/00; F25B 2500/03; F25B 2400/23; F25B 2700/00; F25B 29/00; B01F 5/043; Y10T 29/49352
USPC ............................................. 62/86, 401, 509
See application file for complete search history.

(56) References Cited

U.S. PATENT DOCUMENTS

| | | | | |
|---|---|---|---|---|
| 3,392,547 A * | 7/1968 | Hopkins | ................. | F25B 15/06 62/141 |
| 4,430,461 A * | 2/1984 | Deering | ................. | C08G 77/34 159/47.1 |
| 4,981,023 A * | 1/1991 | Krishnakumar | .......... | F25B 1/10 62/117 |
| 5,150,580 A * | 9/1992 | Hyde | ...................... | F24F 3/153 62/197 |
| 5,386,700 A | 2/1995 | Hyde | | |
| 5,626,025 A * | 5/1997 | Hyde | ...................... | F25B 40/02 62/117 |
| 5,749,237 A | 5/1998 | Sandofsky et al. | | |
| 5,752,390 A * | 5/1998 | Hyde | ...................... | F25B 41/00 62/196.4 |
| 6,145,332 A * | 11/2000 | Hyde | ...................... | F04B 49/02 62/190 |
| 2005/0247072 A1* | 11/2005 | Narayanamurthy | .. | F25B 41/062 62/222 |
| 2011/0023515 A1* | 2/2011 | Kopko | ..................... | F25B 49/02 62/222 |
| 2012/0324911 A1* | 12/2012 | Shedd | ..................... | F25B 25/00 62/62 |
| 2013/0111935 A1* | 5/2013 | Zou | .......................... | F25B 9/06 62/117 |

* cited by examiner

*Primary Examiner* — Allana Lewin Bidder
*Assistant Examiner* — Kun Kai Ma
(74) *Attorney, Agent, or Firm* — Richard Malagiere

(57) ABSTRACT

A refrigeration, air conditioning or other cooling system is disclosed. The refrigeration system includes a refrigerant storage tank fluidly connected to a refrigerant expansion device which is fluidly connected to a refrigerant evaporator for absorbing ambient heat, a refrigerant vapor compressor fluidly connected to the refrigerant evaporator and a refrigerant condenser fluidly connected to the refrigerant compressor and the refrigerant storage tank. A liquid refrigerant pump and eductor are included in the system along with a refrigerant receiving tank and associated controls that maintain the appropriate Net Positive Suction Head at the inlet to the pump along with proper flow and pressure control in the system.

12 Claims, 3 Drawing Sheets

APPARATUS FOR IMPROVING REFRIGERATION CAPACITY

PRIORITY CLAIM

Applicant claims the benefit of provisional application 61/742,558, filed Aug. 14, 2012. The disclosure set forth in said provisional application is incorporated herein by reference.

BACKGROUND OF THE INVENTION

1. Field of the Invention

This invention generally relates to the modification of mechanical refrigeration or air conditioning systems to include a complete, integrated liquid refrigerant pumping system. Applicant's system also proactively protects the refrigerant pump from damage related to cavitation and the loss of lubrication as result of vaporous refrigerant entering the pump, by consistently supplying the pump with liquid refrigerant above its NPSH requirement. Applicant's system also contains itself within a greatly reduced footprint allowing the system to be installed or retrofitted in spatially limited areas.

2. Description of the Prior Art

In the operation of commercial freezers, refrigerators, air conditioners, and other compression-type refrigeration systems, is desirable to maximize refrigeration capacity while minimizing energy consumption. One means to reach that goal has been to include a liquid refrigerant pump in the refrigeration system circuit in order to suppress the formation of "flash gas". Flash gas is the spontaneous flashing or boiling of liquid refrigerant resulting from pressure losses in the liquid refrigerant conduit. The prior art identified that it is beneficial to include a liquid refrigerant pump in the liquid refrigerant conduit that terminates at the refrigerant expansion device in order to suppress flash gas in that conduit.

As an example of these prior attempts, see U.S. Pat. Nos. 4,599,873; 5,150,580; 5,386,700; 5,626,025; 5,752,390; 6,145,332 all issued to Hyde, and U.S. Pat. No. 5,749,237 to Sandofsky.

Additionally, the prior art identified the disastrous effect that flash gas has on the liquid refrigerant pump if it is allowed to enter the pump through the pump inlet. Excess flash gas entering the liquid refrigerant pump will cause cavitation; since vaporous refrigerant cannot be returned to its liquid state by means of a liquid refrigerant pump, there will consequently be no hope of suppressing flash gas in the conduit leading to the refrigerant expansion device by means of said liquid refrigerant pump. Additionally, cavitation causes pump damage.

An example of a prior art attempt to address the problem of flash gas entering the liquid refrigerant pump through its inlet is U.S. Pat. No. 6,145,332 issued to Hyde. The patent delineates a means to protect the liquid refrigerant pump from cavitation due to vaporous refrigerant entering the pump through its inlet by means of a reactive approach.

Past attempts to implement the prior art have not always supplied the liquid refrigerant pump with its required NPSH. Space constraints often do not permit a vertical column of vapor free liquid refrigerant that is high enough above the center line of the liquid refrigerant pump inlet to insure that the required NPSH is available to the liquid refrigerant pump.

The need remains to address the problem of flash gas entering the liquid refrigerant pump through the pump inlet.

Applicant's invention protects the liquid refrigerant pump from cavitation due to vaporous refrigerant entering the pump through its inlet by means of a proactive approach. Applicant's invention provides for consistent net positive suction head or NPSH above that required by the pump manufacturer at the pump inlet to minimize the likelihood of the occurrence of "flash gas" and cavitation. NPSH refers to the amount by which the liquid pressure at the pump inlet exceeds the saturation pressure of the liquid. The need to provide for sufficient NPSH to prevent cavitation is essential in the design of refrigeration or air conditioning systems which include liquid refrigerant pumps.

NPSH available to the liquid refrigerant pump is calculated by measuring the height of the vapor free column of liquid refrigerant that is above the centerline of the pump inlet and subtracting all pressure losses as it travels from there to the centerline of the pump inlet. The positive pressure difference between the liquid pressure at the centerline of the pump inlet and the liquid pressure at the top of the vapor free column of liquid refrigerant is correlated to the NPSH available. Due to the weight of the liquid refrigerant, NPSH available increases as the height of the liquid refrigerant column increases.

NPSH required by the liquid refrigerant pump is supplied by the pump manufacturer. NPSH required is the minimum height of liquid above the pump inlet that will allow the pump to operate without cavitation caused by vaporous refrigerant at the pump inlet.

Applicant's system prevents "flash gas" at both the inlet and outlet side of the liquid refrigerant pump by maintaining vapor free liquid refrigerant in the portion of the system loop entering the liquid refrigerant pump at a sufficient height above the pump inlet to meet or exceed the pump's required minimum NPSH. Applicant's system does this automatically without an excess amount of control technology, utilizing the pressure differentials of the system and gravity.

OBJECTS OF THE INVENTION

An object of the present invention is to provide for a novel refrigeration system of the compression type, with improved efficiency.

A further object of the present invention is to provide for a novel refrigeration system in which the refrigeration capacity is maximized.

A still further object of the present invention is to economically suppress the formation of "flash gas" in refrigeration systems without impairing refrigeration capacity and efficiency.

A still further object of the present invention is to automatically supply the refrigeration systems expansion devices with their specified amount of pressure drop across said expansion devices in order that they operate at their rated capacities.

A still further object of the present invention is to automatically supply the refrigeration system's expansion devices with their specified amount of pressure drop across the expansion devices regardless of whether or not the expansion device is a thermostatic expansion valve, electronic expansion valve, or electric expansion valve, and that the invention will also have application to direct expansion systems as well as systems employing secondary loop with direct expansion cooling and secondary fluid, as well as cascade refrigeration and transcritical carbon dioxide refrigeration and subcritical carbon dioxide refrigeration.

A still further object of the present invention is to provide a system that is easily retrofitted to an operational refrigeration system.

A still further object of the present invention is to provide a system that will allow the original refrigeration system to operate properly whether the present invention is in operation or out of operation.

A still further object of the present invention is to put into one package a liquid refrigerant pumping system that proactively prevents pump cavitation.

A still further object of the present invention is to provide for a liquid refrigerant pumping system that presents a small footprint thereby allowing it to be installed or retrofitted into a spatially limited area.

SUMMARY OF THE INVENTION

A refrigeration system for refrigeration, air conditioning or other cooling application comprising a refrigerant storage tank for storing liquid refrigerant; refrigerant expansion device comprising an inlet and an outlet for receipt of liquid refrigerant and lowering the pressure thereof; a refrigerant evaporator fluidly connected to the outlet of the refrigerant expansion device in which ambient heat is absorbed and the liquid refrigerant is evaporated to the vapor state; a vapor compressor fluidly connected to the evaporator for receiving the refrigerant vapor and raising the pressure thereof; a refrigerant condenser fluidly connected to the vapor compressor for condensing the refrigerant vapor back to the liquid state; a refrigerant receiving tank fluidly connected to the condenser for receiving the liquid refrigerant from the condenser and maintaining a minimally high level of liquid refrigerant within the tank; a monitoring device and liquid level probe to maintain and monitor optimum liquid pressures within the refrigeration system; a liquid refrigerant pump driven by an electric motor which receives the liquid refrigerant from the refrigerant receiving tank, pressurizes the refrigerant and discharges the refrigerant to the inlet of the refrigerant expansion device; an eductor fluidly connected to the discharge from the liquid refrigerant pump, the refrigerant storage tank and the refrigerant receiving tank and which utilizes a portion of the pressurized refrigerant from the liquid refrigerant pump to continuously transfer a constant preselected amount of liquid refrigerant from the refrigerant storage tank to the refrigerant receiving tank independent of system cooling demand; wherein the receiving tank is vertically elevated above the liquid pump and the minimum predetermined level of liquid column height is maintained to provide the minimum net positive suction head at the liquid refrigerant pump to prevent cavitation of the liquid refrigerant in the pump.

BRIEF DESCRIPTION OF THE DRAWINGS

These and other objects of the present invention will become apparent, particularly when taken in light of the following illustrations wherein.

DETAILED DESCRIPTION OF THE INVENTION

Figure 1:
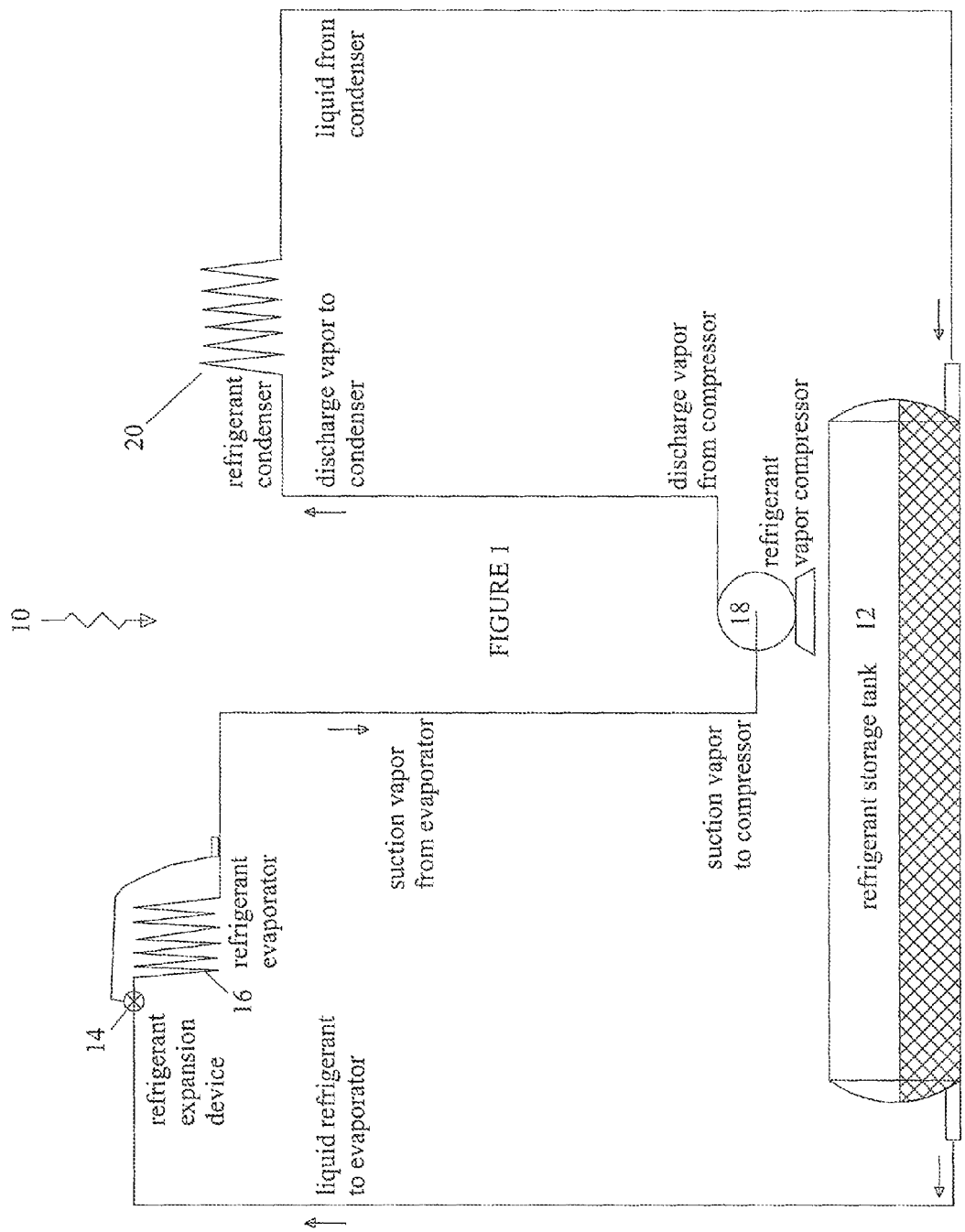
FIG. 1 is a schematic drawing of a typical refrigeration system of the prior art.

FIG. 1 is a schematic illustration of a typical refrigeration system 10 of the prior art. It consists of several main constituents. Initially there is a refrigerant storage tank 12 in which the flowing liquid refrigerant is temporarily stored. There is a refrigerant expansion device 14 which converts the liquid refrigerant to vapor in the refrigerant evaporator 16. The refrigerant vapor is then directed by means of a refrigerant vapor compressor 18 to a refrigerant condenser 20 where the vapor is then converted from vapor to liquid and returned to the refrigerant storage tank. In this system of the prior art, discharge vapor and liquid pressures and temperatures must be maintained at minimum levels that are high enough to provide the refrigerant system's expansion devices with liquid refrigerant at pressures and temperatures that will provide the required amount of heat removal. Unless proper pressure and temperature ranges are maintained, "flash gas" will develop in the liquid refrigerant conduit that terminates at the refrigerant expansion device and or pressure differences from inlet to outlet of the expansion devices will be below the levels needed for the expansion devices to operate at their nominal rated capacities. In this system of the prior art, a minimum discharge vapor pressure must be maintained regardless of ambient temperature, in order to maintain the required minimum pressure differential across the expansion devices. The flow of the liquid refrigerant and the vapor refrigerant is through conduit in the direction identified by the arrows. In this system of the prior art, the refrigerant vapor compressor is the sole source of the pressure difference creation to move liquid and vapor through the system.

Figure 2:
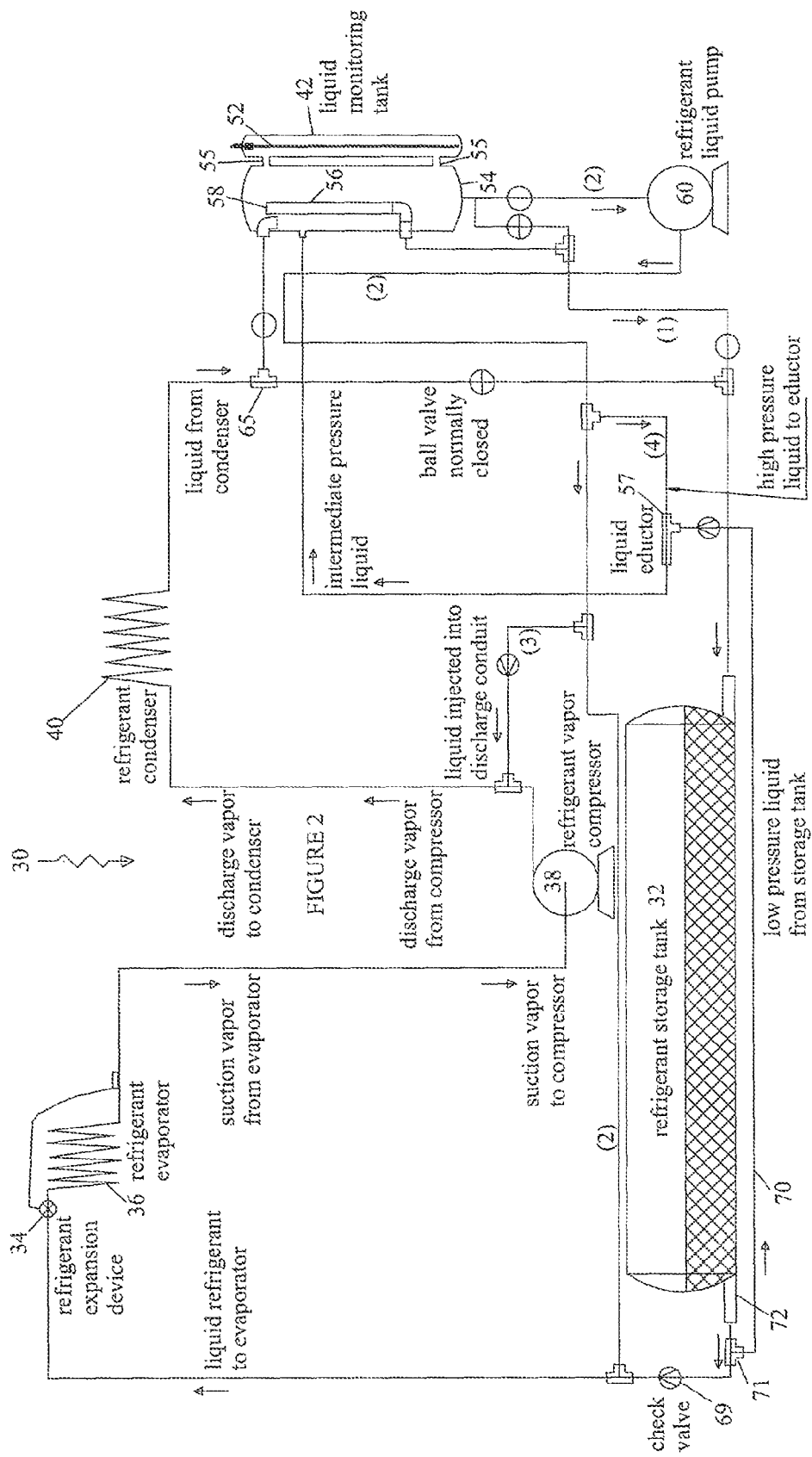
FIG. 2 is a schematic drawing of the refrigeration system of the present invention.

FIG. 2 is a schematic diagram of Applicant's refrigeration system 30. Applicant's system as illustrated in FIG. 2 contains similar items to that of the prior art, but have been assigned different reference numerals to distinguish Applicant's system from the prior art. The similar items include a refrigerant storage tank 32 for storing liquid refrigerant is in communication with a refrigerant expansion device 34 which vaporizes the liquid refrigerant as it enters into the refrigerant evaporator 36 where the actual heat removal or refrigeration takes place (i.e., a dairy case, or frozen food section of a supermarket). Superheated vaporous refrigerant exits the refrigerant evaporator and is then transported by means of a refrigerant vapor compressor 38 to a refrigerant condenser 40 wherein sufficient heat is removed from the vapor refrigerant in order to convert it back to liquid refrigerant. At this point in the prier art, the liquid refrigerant would be directed to the refrigerant storage tank. Applicant has interposed between the refrigerant condenser 40 and the refrigerant storage tank 32, a liquid refrigerant pump 60 and an electrical controller and liquid refrigerant level probe 52 and a plurality of tanks and valves which control the flow of the liquid refrigerant and eliminate the "flash gas" problem and deliver sub cooled liquid refrigerant to the expansion devices at pressures that will ensure that their specified nominal capacities are achieved. The liquid refrigerant pump 60 is a centrifugal type pump as distinguished from positive displacement pumps that may have been used in certain available refrigeration systems.

The first tank is referred to as the liquid receiving tank 54. Connections 55 are made between the lower portion and the upper portion of liquid receiving tank 54 and liquid monitoring tank 42. While Applicant's system is operating, liquid refrigerant from the liquid refrigerant pump is interjected into the liquid refrigerant conduit downstream of check valve 69 at the outlet of the refrigerant storage tank at a pressure that is higher than within the storage tank itself, allowing liquid refrigerant flow from the liquid refrigerant pump discharge, but preventing liquid refrigerant flow from the storage tank outlet to the expansion device. In order to move liquid refrigerant that is unavailable to the operating portion of the system, the present invention uses the liquid venturi eductor 57 to continually move liquid refrigerant from storage tank 32 to liquid receiving tank 54 and liquid monitoring tank 42 and finally to liquid refrigerant pump 60 and the operating portion of the refrigeration system. In particular, the educator 57 receives a portion of the high pressure liquid refrigerant from the discharge of the refrigerant pump 60 and the high pressure liquid refrigerant flows into a venturi in the educator where its velocity is increased. The high pressure high velocity liquid refrigerant exits the venturi and is mixed with the low pressure refrigerant from the refrigerant storage tank 32. As a result of frictional mixing of the liquids, low pressure liquid refrigerant is transported from the refrigerant storage tank 32 to the refrigerant receiving tank 54. By use of overflow conduit 56 within receiving tank 54 and by use of liquid venturi eductor 57, liquid refrigerant in the liquid receiving tank 54 is continually maintained at a height that meets or exceeds the pump's minimum NPSH requirement.

The liquid monitoring tank 42 is formed with a probe 52 that measures the height of liquid refrigerant therein and is in communication by means of the liquid refrigerant pump motor and an electrical controller. Liquid receiving tank 54 of the present invention is formed with an interior overflow conduit 56 within the tank itself to ensure that liquid refrigerant must reach terminus 58 before it can drain into refrigerant storage tank 32. The column height of liquid refrigerant in Applicant's invention that is available to the liquid refrigerant pump 60 is continually in close proximity to the upper terminus 58 of the overflow conduit 56. Together with the piping arrangement within receiving tank 54 and liquid venturi educator 57 and an electrical controller, liquid within liquid receiving tank 54 is kept at a height which is at or above the level needed to insure that NPSH available to the pump is at or above the NPSH required by the pump, by means of the present invention.

The preferred embodiment of Applicant's system utilizes a liquid receiving tank 54 and a liquid monitoring tank 42 which are in communication with each other and are generally positioned vertically parallel to each other. The liquid monitoring tank contains probe 52 which as described hereafter is in communication with a variety of level and pressure probes, etc., which monitor the system and provide a read out of the system both proximate to the location of the system or a read out which can be transmitted some distance from the system so that the overall operation of the system can be monitored. Probe 52 is positioned within liquid monitoring tank 42 in order to partially isolate it from any turbulence which may occur in the liquid receiving tank 54 as a result of the introduction of liquid refrigerant into the liquid receiving tank, overflow of the liquid refrigerant and the outward flow of liquid refrigerant from liquid receiving tank 54. It will be recognized by those of ordinary skill in the art that probe 52 may well be placed within the liquid receiving tank 54 with the elimination of the liquid monitoring tank 42 depending upon space constraints.

Liquid refrigerant passing through T connection 65 sends the liquid refrigerant to one of four possible locations identified by pathways 1-4 as depicted in FIG. 2. Pathway (1) by way of overflow conduit 56 the liquid refrigerant could be directed to the refrigerant storage tank 32 and will not enter the liquid refrigerant pump; pathway (2) by way of the liquid refrigerant pump 60 the liquid refrigerant could be directed to the liquid refrigerant conduit leading to the refrigerant expansion device 34 and the refrigerant evaporator 36; pathway (3) by way of the liquid refrigerant pump 60 a portion of the liquid refrigerant could be injected into the vapor discharge line from the refrigerant vapor compressor 38 to cool the super heated discharge gas prior to its introduction into the refrigerant condenser 40; pathway (4) a portion of the high pressure liquid is sent to the high pressure connection of the liquid venturi eductor 57, then through a pressure reducing nozzle, producing a venturi effect which causes a low pressure area in conduit 70 which is interposed between the suction port of the liquid venturi eductor 57 and T connection 71 at liquid refrigerant outlet conduit 72 of refrigerant storage tank 32, causing liquid refrigerant from refrigerant storage tank 32 to be entrained in conduit 70, then mixing with the high pressure liquid to form an intermediate pressure liquid which discharges from the discharge port of the liquid venturi eductor 57 and travels into liquid receiving tank 54.

Applicant's refrigerant receiving tank is relatively small when compared to refrigerant storage tank 32. Refrigerant storage tank 32 is normally much too large and unwieldy to be installed and oriented in such a way that it could be used to ensure adequate NPSH requirements to a liquid refrigerant pump. Along with the piping and valving arrangement in Applicant's system and the use of a liquid venturi eductor and specially piped liquid refrigerant receiving tank 54, Applicant's invention is configured with a spatially small footprint within a spatially small and compact overall package. Applicant's invention presents an excellent retrofit to existing cooling systems or as part of the integrated design to new refrigeration systems. Applicant's invention improves efficiency and reduces power consumption of traditional refrigeration and air conditioning systems. The carbon footprint of new and existing refrigeration and air conditioning systems are significantly reduced by adding Applicant's invention to said equipment.

The flow of liquid refrigerant through the liquid venturi eductor described above serves two purposes; purpose one is to provide for minimum flow through the liquid refrigerant pump when cooling demand is low and demand for refrigerant flow to the refrigerant evaporators are reduced or stopped; purpose two is to continually move liquid refrigerant from storage tank 32 to liquid receiving tank 54 in order to always keep an adequate amount of liquid refrigerant in liquid receiving tank 54 so that liquid refrigerant pump 60 has its specified amount of NPSH available at all times and so that the possibility of pump cavitation is greatly reduced.

Liquid refrigerant level probe 52 within the liquid monitoring tank 42 is in communication with electrical controller 90 and variable frequency drive (See FIG. 3) and continually monitors the level of liquid refrigerant within the liquid monitoring tank and consequently within liquid receiving tank 54. By means of liquid monitoring tank 42, probe 52, and electrical controller 90, liquid refrigerant pump 60 will not operate until the liquid refrigerant level detected by probe 52 is at a height adequate to ensure that required NPSH is available to the liquid refrigerant pump 60 while it is in operation.

Figure 3:
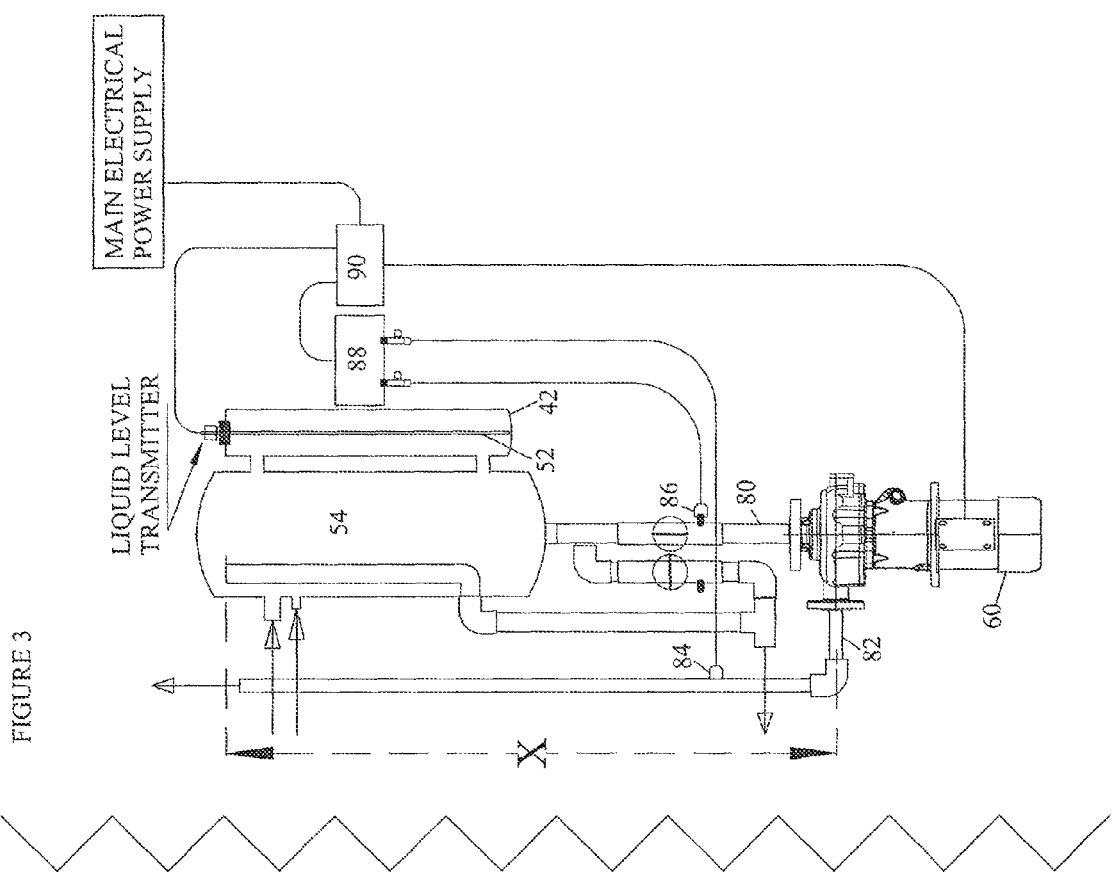
FIG. 3 is an elevation view of the refrigerant pumping system portion of FIG. 2.

FIG. 3 is an elevational view of the refrigeration pumping system as illustrated schematically in FIG. 2. Height X represents the height of liquid refrigerant used to determine the NPSH available to the liquid refrigerant pump 60. By means of the overflow pipe in liquid receiving tank 54 and liquid venturi eductor 57, NPSH available to liquid refrigerant pump 60 is always kept in close proximity to height X.

FIG. 3 illustrates the inlet conduit 80 to refrigerant liquid pump 60 and the outlet conduit 82 from refrigerant liquid pump 60. Both of these conduits have positioned therein, a sensor 84 and 86, in communication with a pressure transducer 88. Additionally, the refrigerant liquid pump 60 is in communication with a variable frequency drive 90 which variable frequency drive is in communication with the pressure transducer 88, as well as the level sensor 52, positioned within liquid monitoring tank 42. The variable frequency drive by monitoring the pressure transducer sensors and the level sensor, controls the operation of the pump and thereby matches demand for liquid refrigerant flow in the system and also adds the proper amount of pressure to the liquid refrigerant so that expansion device 34 operates at its specified capacity.

It should be noted that the expansion valve 34 as illustrated in FIG. 2, can include thermostatic expansion valves, electronic expansion valves, and electric expansion valves, as well as any other expansion device that needs a minimum amount of pressure differential across it to perform at its specified nominal capacity. The nominal capacity of these valves degrade as the pressure drop falls below the stated value and increases as the pressure drop rises above the stated value. Applicant's system insures the maintenance of at least the nominal capacity of the expansion valve regardless of the type of expansion valve utilized in the system. Still further, Applicant's system has application to direct expansion refrigeration systems as illustrated in FIG. 2, and also to secondary loop cooling systems that employ direct expansion refrigeration to cool its secondary fluid. Applicant's system will also improve performance of cascade refrigeration loops and transcritical carbon dioxide refrigeration and subcritical carbon dioxide refrigeration systems which employ the types of expansion devices mentioned above.

Therefore, while the present invention has been disclosed with respect to the preferred embodiments thereof, it will be recognized by those of ordinary skill in the art that various changes and modifications can be made without departing from the spirit and scope of the invention. It is therefore manifestly intended that the invention be limited only by the claims and the equivalence thereof.

What is claimed is:

1. A refrigeration system for refrigeration, air conditioning or other cooling application comprising:
   a) A refrigerant storage tank for storing liquid refrigerant;
   b) A refrigerant expansion device comprising an inlet and an outlet for receipt of liquid refrigerant and lowering the pressure thereof;
   c) A refrigerant evaporator fluidly connected to the outlet of the refrigerant expansion device in which ambient heat is absorbed and the liquid refrigerant is evaporated to the vapor state;
   d) A vapor compressor fluidly connected to the evaporator for receiving the refrigerant vapor and raising the pressure thereof;
   e) A refrigerant condenser fluidly connected to the vapor compressor for condensing the refrigerant vapor back to the liquid state;
   f) A refrigerant receiving tank fluidly connected to the condenser for receiving the liquid refrigerant from the condenser;
   g) A monitoring device and liquid level probe to maintain the level of liquid refrigerant in the receiving tank at a minimum predetermined level;
   h) A liquid refrigerant pump driven by an electric raptor which receives the liquid refrigerant from the refrigerant receiving tank, pressurizes the refrigerant and discharges the refrigerant to the inlet of the refrigerant expansion device;
   i) An eductor fluidly connected to the discharge from the liquid refrigerant pump, the refrigerant storage tank and the refrigerant receiving tank and which utilizes a portion of the pressurized refrigerant from the liquid refrigerant pump to continuously transfer a constant preselected amount of liquid refrigerant from the refrigerant storage tank to the refrigerant receiving tank;
Wherein the receiving tank is vertically elevated above the liquid pump and the minimum predetermined level is set to maintain the minimum net positive suction head at the liquid refrigerant pump to prevent cavitation of the liquid refrigerant in the pump.

2. The refrigeration system of claim 1 wherein the monitoring device comprises a liquid monitoring tank that is fluidly connected at a lower portion of the receiving tank and an upper portion of the receiving tank and comprises the liquid level probe to measure the height of the liquid refrigerant in the receiving tank.

3. The refrigeration system of claim 1 further comprising a first pressure sensor at the inlet to the liquid refrigerant pump and a second pressure sensor at the outlet to the liquid refrigerant pump wherein the first pressure sensor and the second pressure sensor are in communication with a pressure transducer.

4. The refrigeration system of claim 2 or 3 further comprising a variable frequency drive for the electric motor wherein the variable frequency drive receives signals from the pressure transducer and the liquid level probe and thereby controls the operation of the pump to produce the proper amount of refrigerant flow through the refrigeration system to match the required cooling load.

5. The refrigeration system of claim 4 wherein the variable frequency drive further controls the pressure of the liquid refrigerant at the outlet to the liquid refrigerant pump so that pressure at the inlet to the refrigerant expansion device allows the refrigerant expansion device to operate at its specified capacity.

6. The refrigeration system of claim 1 wherein the refrigerant expansion device is either a thermostatic expansion valve, an electronic expansion valve, or any expansion device that requires a minimum amount of pressure differential between the inlet and the outlet of the expansion device to operate at its specified capacity.

7. The refrigeration system of claim 1 wherein the liquid refrigerant pump is a centrifugal pump.

8. The refrigeration system of claim 1 wherein the refrigerant receiving tank is axially aligned with the centerline of the inlet to the refrigerant pump.

9. A method of improving a refrigeration, air conditioning, or cooling system wherein the system comprises a refrigerant storage tank fluidly connected to a refrigerant expansion device which is fluidly connected to a refrigerant evaporator for absorbing ambient heat, a refrigerant vapor compressor fluidly connected to the refrigerant evaporator and a refrigerant condenser fluidly connected to the refrigerant compressor and the refrigerant storage tank wherein the method comprises the steps of:
   a) providing a liquid refrigerant centrifugal pump driven by an electric motor fluidly connected to the inlet of the refrigerant expansion device;
   b) providing a liquid refrigerant receiving tank vertically disposed above the refrigerant pump and connected to the inlet of the liquid refrigerant pump and a monitoring device and liquid level probe to maintain the level of liquid in the receiving tank at a predetermined level;
   c) providing an eductor fluidly connected to the discharge of the liquid refrigerant pump, the refrigerant storage tank and the refrigerant receiving tank wherein the eductor utilizes a portion of the pressurized refrigerant from the liquid refrigerant pump to continuously provide liquid refrigerant from the refrigerant storage tank to the refrigerant receiving tank and the predetermined level is maintained by the monitoring device at the level required to maintain the minimum net positive suction head at the liquid refrigerant pump to prevent cavitation of the liquid refrigerant in the pump.

10. The method of claim 9 further comprising the step of providing a first pressure sensor at the inlet to the liquid refrigerant pump and a second pressure sensor at the outlet to the liquid refrigerant pump wherein the first pressure sensor and the second pressure sensor are in communication with a pressure transducer.

11. The method of claim 10 further comprising the step of providing a variable frequency drive for the electric motor wherein the variable frequency drive receives signals from the pressure transducer and the liquid level probe and thereby controls the operation of the liquid refrigerant pump to produce the proper amount of refrigerant flow through the refrigeration system to match the required cooling load.

12. The method of claim 11 further comprising the step of the variable frequency drive controlling the pressure of the liquid refrigerant at the outlet to the liquid refrigerant pump so that pressure at the inlet to the refrigerant expansion device allows the refrigerant expansion device to operate at its specified capacity.

* * * * *